(12) United States Patent
Kataoka et al.

(10) Patent No.: US 10,368,681 B2
(45) Date of Patent: Aug. 6, 2019

(54) FOODS IN FOOD CONTAINER, AND HEATING DEVICE FOR FOODS IN FOOD CONTAINER

(71) Applicant: Panasonic Intellectual Property Management Co., Ltd., Osaka (JP)

(72) Inventors: Akira Kataoka, Shiga (JP); Masaki Shibuya, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/112,181

(22) PCT Filed: Feb. 23, 2015

(86) PCT No.: PCT/JP2015/000840
§ 371 (c)(1),
(2) Date: Jul. 17, 2016

(87) PCT Pub. No.: WO2015/125491
PCT Pub. Date: Aug. 27, 2015

(65) Prior Publication Data
US 2016/0367062 A1     Dec. 22, 2016

(30) Foreign Application Priority Data

Feb. 24, 2014   (JP) .................................. 2014-032683

(51) Int. Cl.
*H05B 6/64* (2006.01)
*A47J 27/17* (2006.01)
(Continued)

(52) U.S. Cl.
CPC ............... *A47J 27/17* (2013.01); *A23L 3/365* (2013.01); *A23L 5/00* (2016.08); *A23L 5/13* (2016.08);
(Continued)

(58) Field of Classification Search
CPC ...... H05B 6/64; H05B 6/647; H05B 6/64791; H05B 6/6494; H05B 6/6479
(Continued)

(56) References Cited

U.S. PATENT DOCUMENTS 4,398,077 A * 8/1983 Freedman ............ H05B 6/6494
219/729
4,728,762 A * 3/1988 Roth ..................... A47J 36/027
219/681

(Continued)

FOREIGN PATENT DOCUMENTS

CN     1526992 A     9/2004
GB     2493137        1/2013
(Continued)

OTHER PUBLICATIONS

International Search Report of PCT application No. PCT/JP2015/000840 dated May 19, 2015.

(Continued)

*Primary Examiner* — Dana Ross
*Assistant Examiner* — Ayub A Maye
(74) *Attorney, Agent, or Firm* — Brinks Gilson & Lione (57) ABSTRACT

A heating device for a food item in a food container includes the food container that contains the food items, a cooking container that contains the food container, and a steam generation device that supplies steam into the cooking container. The food container has an opening hole that communicates with an internal space and an external space, and at least one of a food surrounding space provided between an inner wall of the food container and the food items, and between the food items. The food surrounding space and the external space are communicated with each other through the opening hole, and steam is supplied into the cooking container to heat the food items by the steam. Thereby, the heating device for a food item in a food container that can subject the food item in the cooking container to steam heating can be provided.

9 Claims, 4 Drawing Sheets

(51) Int. Cl.
*A23L 7/00* (2016.01)
*A23L 5/00* (2016.01)
*A23L 3/365* (2006.01)
*B65D 81/34* (2006.01)
*A23L 5/10* (2016.01)

(52) U.S. Cl.
CPC .................. *A23L 5/15* (2016.08); *A23L 7/00* (2016.08); *B65D 81/3438* (2013.01); *B65D 2581/3404* (2013.01); *B65D 2581/3422* (2013.01); *B65D 2581/3428* (2013.01)

(58) Field of Classification Search
USPC ............... 219/678, 725, 731, 401, 682, 730; 99/451
See application file for complete search history.

(56) References Cited

U.S. PATENT DOCUMENTS

| | | | | |
|---|---|---|---|---|
| 5,229,563 | A * | 7/1993 | Isogai | A47J 27/088 |
| | | | | 219/686 |
| 6,040,564 | A * | 3/2000 | Ueda | H05B 6/6479 |
| | | | | 219/401 |
| 6,095,324 | A * | 8/2000 | Mullin | B65D 81/266 |
| | | | | 206/204 |
| 6,730,895 | B2 * | 5/2004 | Kim | H05B 6/6479 |
| | | | | 219/682 |
| 7,067,778 | B2 * | 6/2006 | Kim | H05B 6/6494 |
| | | | | 219/682 |
| 7,138,616 | B2 * | 11/2006 | Isogai | A47J 36/027 |
| | | | | 219/730 |
| 7,193,194 | B2 * | 3/2007 | Isogai | A47J 36/027 |
| | | | | 219/730 |
| 8,042,458 | B2 * | 10/2011 | Ueda | A21B 3/04 |
| | | | | 126/21 A |
| 9,686,826 | B2 * | 6/2017 | Tai | H05B 6/6479 |
| 2005/0082305 | A1 * | 4/2005 | Dais | B65D 43/021 |
| | | | | 220/785 |
| 2015/0359047 | A1 * | 12/2015 | Kishimoto | H05B 6/6447 |
| | | | | 219/704 |

FOREIGN PATENT DOCUMENTS

| | | |
|---|---|---|
| JP | 53-013955 U | 2/1978 |
| JP | 53-036391 B | 10/1978 |
| JP | 57-098267 U | 6/1982 |
| JP | 60-068071 U | 5/1985 |
| JP | 63-080987 U | 5/1988 |
| JP | 3-023087 U | 3/1991 |
| JP | 3-023087 U | 3/1991 |
| JP | 8-070993 | 3/1996 |
| JP | 9-101034 | 4/1997 |
| JP | 10-248717 | 9/1998 |
| JP | 11-113548 A | 4/1999 |
| JP | 2000-279148 | 10/2000 |

OTHER PUBLICATIONS

English Translation of Chinese Search Report dated Mar. 5, 2019 for the related Chinese Patent Application No. 201580009199.7.

* cited by examiner

FOODS IN FOOD CONTAINER, AND HEATING DEVICE FOR FOODS IN FOOD CONTAINER

THIS APPLICATION IS A U.S. NATIONAL PHASE APPLICATION OF PCT INTERNATIONAL APPLICATION PCT/JP2015/000840.

TECHNICAL FIELD

The present invention relates to a food container in which a food item is put beforehand, and a heating device for a food item in a food container that heats the food item in the food container by steam.

BACKGROUND ART

Conventionally, as a food container with a food item therein, there has been proposed a container with a food item therein that is subjected to thawing cooking in a state where a cooked food, which is frozen, is contained in the container (e.g., refer to PTL 1).

However, the conventional container with a food item therein is opened on one opening edge side of a cylindrical barrel portion, and is provided with a bottom plate having a number of small holes on the other opening edge side. The container with a food item therein is configured so that any one of opening edges serves as a port for steam introduction, and the other opening edge serves as a port for steam suction. Therefore, the conventional container with a food item therein requires a very large device for subjecting the cooked food to thawing cooking.

CITATION LIST

Patent Literature

PTL 1: Unexamined Japanese Utility Model Publication No. Sho-60-68071

SUMMARY OF THE INVENTION

The present invention provides a food container with a food item therein in a state where a food item is beforehand put in a food container and is heated by steam, and a heating device for a food item in a food container that heats the food item in the food container.

That is, the food container with a food item of the present invention includes a food container that contains and seals one or more food items, the food container having an opening hole for steam suction to communicate with an internal space and an external space of the food container, and at least one of a food surrounding space provided between an inner wall of the food container and the food items, and between the food items. The food container is configured such that the food surrounding space and the external space are communicated with each other through the opening hole.

According to this configuration, the steam is charged into the food surrounding space inside the food container from the opening hole for steam suction. This allows the steam to easily reach the food items, so that the food items can be quickly subjected to steam heating.

Moreover, a heating device for a food item in a food container of the present invention includes the food container that contains one or more the food items, a cooking container that contains the food container, and a steam generation device that supplies steam into the cooking container. Furthermore, the food container has an opening hole to communicate with an internal space and an external space of the food container, and at least one of a food surrounding space provided between an inner wall of the food container and the food items, and between the food items. The heating device for a food item in a food container has a configuration in which the food surrounding space and the external space are communicated with each other through the opening hole, and the steam is supplied into the cooking container from the steam generation device to subject the food items to the steam heating.

According to this configuration, the internal space of the food container communicated with the external space around the food container is formed around the food items in the food container. The internal space of the food container is communicated with the opening hole provided in the food container. Thus, when the steam is charged into the cooking container where the food container is installed, the steam easily reaches the food items in the food container. This can realize the heating device for a food item in a food container that quickly heats the food items by the steam. That is, a large device necessary for sucking the steam as in the conventional art becomes unnecessary.

Moreover, according to the above-described configuration, the food items are contained in the food container, and the food container is provided with the opening hole beforehand. Thus, especially, when the food items are provided to a customer at a restaurant or the like, the restaurant side can perform the steam heating only by putting the food container with a food item therein into the cooking container as it is without directly touching the food items. This can inexpensively realize the heating device for a food item in a food container that is clean and easy to handle, and can effectively heat the food items by the steam.

DESCRIPTION OF EMBODIMENTS

Hereinafter, exemplary embodiments of the present invention will be described with reference to the drawings. The exemplary embodiments do not limit the present invention.

First Exemplary Embodiment

A configuration of a food container with a food item therein and a heating device for a food item in a food container in a first exemplary embodiment of the present invention will be described with reference to FIGS. 1 to 4.

Figure 1:
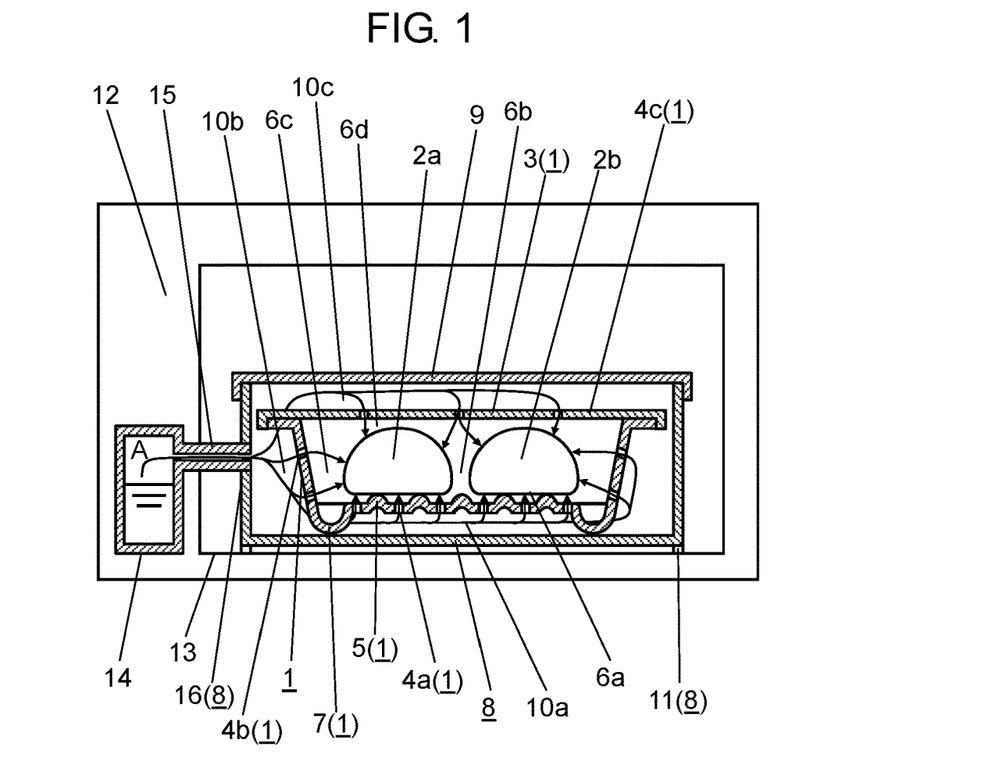
FIG. 1 is a cross-sectional view showing a food container with a food item therein and a heating device for a food item in a food container in a first exemplary embodiment of the present invention.
Figure 2:
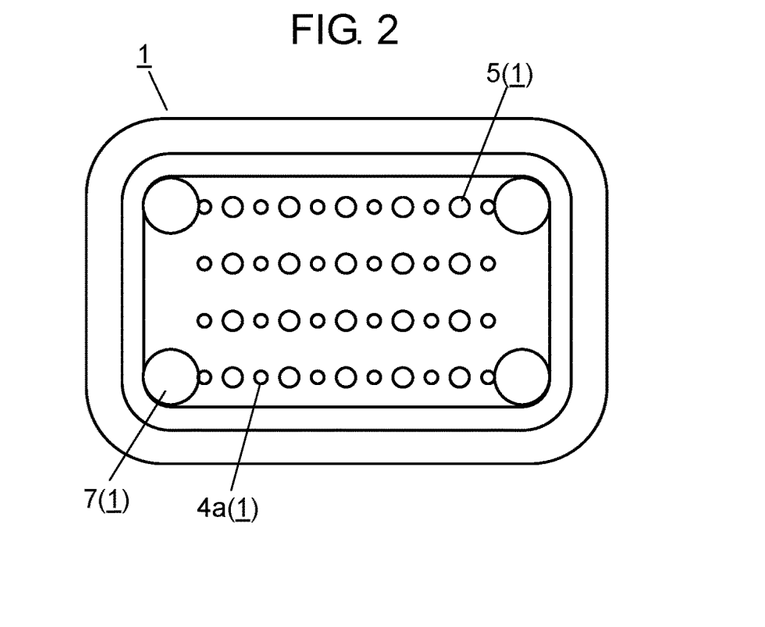
FIG. 2 is a rear view of the food container with a food item therein in the first exemplary embodiment.
Figure 3:
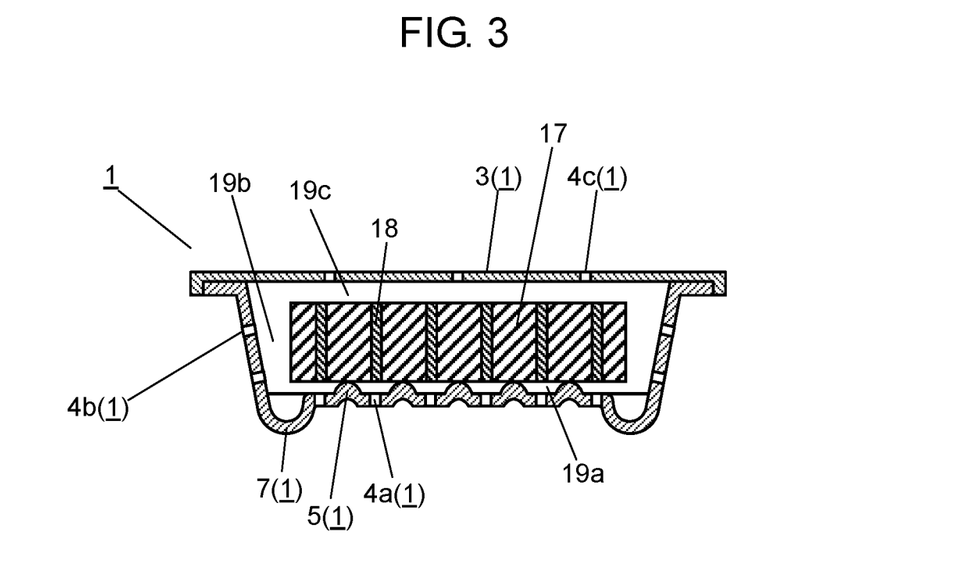
FIG. 3 is an essential part cross-sectional view of the food container with a food item therein, which shows, as an example, a case where the food item in the first exemplary embodiment is frozen cooked rice.
Figure 4:
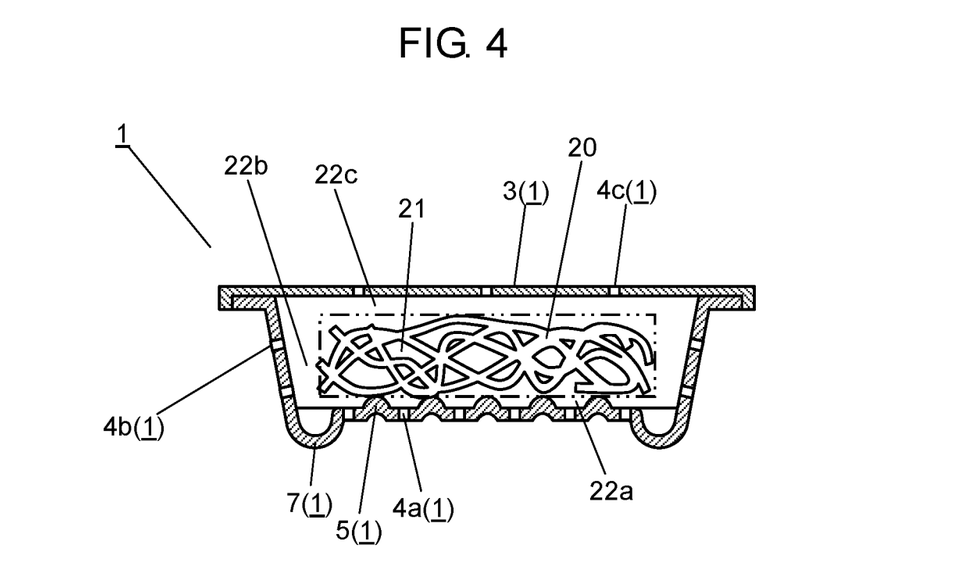
FIG. 4 is an essential part cross-sectional view of the food container with a food item therein, which shows, as an example, a case where the food item in the first exemplary embodiment is frozen noodles.

FIG. 1 is a cross-sectional view showing the food container with a food item therein and the heating device for a food item in a food container in the first exemplary embodiment of the present invention. FIG. 2 is a rear view of the food container with a food item therein in the first exemplary embodiment. FIG. 3 is an essential part cross-sectional view of the food container with a food item therein, which shows, as an example, a case where the food item in the first exemplary embodiment is frozen cooked rice. FIG. 4 is an essential part cross-sectional view of the food container with a food item therein, which shows, as an example, a case where the food item in the first exemplary embodiment is frozen noodles.

As shown in FIGS. 1 and 2, the heating device for a food item in a food container of the first exemplary embodiment is made up of cooker body 12 having at least cooking chamber 13, cooking container 8 having cooking space lid 9, steam generation device 14 and the like. Inside cooking container 8 (hereinafter, may be abbreviated as "cooking space 8"), food container 1 (hereinafter, may be abbreviated as "container 1") that contains and seals food items 2a, 2b and includes container lid 3 is contained.

Container 1 is formed of, for example, a polypropylene resin or the like, and contains one or more food items 2a, 2b (the food items in the food container) such as, for example, meat buns and the like inside. An opening portion is closed by container lid 3 to thereby seal food items 2a, 2b inside container 1.

Moreover, container 1 includes a plurality of opening holes 4a formed in a bottom surface, a plurality of opening holes 4b formed in side surfaces, and a plurality of opening holes 4c formed in container lid 3. This allows an inside of container 1, and for example, an inside of cooking space 8, which is an outside of the container 1, to be communicated with each other through opening holes 4a, 4b, 4c.

Container 1 is provided with holding portion 5 made of spherical projections each having a convex surface on an upper side, in a bottom surface inner wall. Around a highest point of holding portion 5, food items 2a, 2b are held. This allows food surrounding space 6a (hereinafter, abbreviated as "space 6a") to be formed between the bottom surface inner wall other than holding portion 5 of container 1, and food items 2a, 2b. Similarly, food surrounding space 6b (hereinafter, abbreviated as "space 6b") is formed between food item 2a and food item 2b held by holding portion 5. Food surrounding space 6c (hereinafter, abbreviated as "space 6c") is formed between food items 2a, 2b and side surface inner walls of container 1. Furthermore, food surrounding space 6d (hereinafter, abbreviated as "space 6d") is formed between food items 2a, 2b, and an inner wall of container lid 3. This allows spaces 6a, 6b, 6c, 6d provided inside container 1 to be communicated with, for example, the inside of cooking space 8, which is the outside, through opening holes 4a, 4b, 4c formed in container 1 in a mutually communicated state.

Furthermore, container 1 includes, in a bottom surface outer wall, container legs 7 each made of a spherical projection having a convex surface on a lower side.

Moreover, as shown in FIG. 1, above-described cooking space 8 is formed of, for example, a polypropylene resin or the like, and container 1 with container lid 3 is contained in cooking space 8. Cooking space lid 9 formed of, for example, a polypropylene resin or the like is placed on an upper surface of cooking space 8. This makes the inside of cooking space 8 a closed space.

At this time, container legs 7 of container 1 allow clearance 10a to be formed between a bottom surface inner wall of cooking space 8 and the bottom surface outer wall of container 1. Similarly, clearance 10b is formed between container 1 and side surface inner walls of cooking space 8. Furthermore, clearance 10c is formed between container lid 3 and an upper surface inner wall of cooking space 8. This allows clearances 10a, 10b, 10c provided inside cooking space 8 to be communicated with the inside of container 1 through opening holes 4a, 4b, 4c formed in container 1 in a mutually communicated state.

Furthermore, cooking space 8 includes, for example, columnar cooking space legs 11 that support whole cooking space 8 in an outer wall of a bottom surface.

Moreover, cooker body 12 has cooking chamber 13 that contains container 1, cooking space 8 and the like therein. In cooker body 12 outside a side surface of cooking chamber 13, steam generation device 14 that generates steam, for example, by heating with a heater or the like is included. In a front surface of cooking chamber 13 of cooker body 12, a door (not shown) that opens and closes cooking chamber 13 is provided. Further, the door is provided with an operation portion (not shown), so that the operation portion controls the steam generation by steam generation device 14.

Steam generation device 14 includes projection-like steam ejection portion 15 to supply the steam into cooking chamber 13 of cooker body 12 through steam ejection portion 15. As shown in FIG. 1, in the first exemplary embodiment, steam ejection portion 15 is inserted into steam charging port 16 of cooking space 8 to install cooking space 8 inside cooking chamber 13 so that the steam can be introduced into cooking space 8.

The food container with a food item therein and the heating device for a food item in a food container of the first exemplary embodiment are configured as described above.

Hereinafter, operation and actions of the food container with a food item therein and the heating device for a food item in a food container of the first exemplary embodiment will be described with reference to FIG. 1.

First, as shown in FIG. 1, cooking space 8 is installed inside cooking chamber 13 of cooker body 12. Container 1 with container lid 3 that contains and seals food items 2a, 2b is put into cooking space 8. Cooking space lid 9 is placed on the upper surface of cooking space 8.

Next, the operation portion provided in the door of cooker body 12 is operated to drive steam generation device 14. This allows the steam generated in steam generation device 14 to flow into cooking space 8 through steam charging port 16 of cooking space 8 from steam ejection portion 15 to fill cooking space 8. At this time, the steam flowing into cooking space 8 reaches opening holes 4a, 4b, 4c of container 1 through clearances 10a, 10b, 10c, as indicated by arrow A in FIG. 1. The steam flows in from opening holes 4a, 4b, 4c of container 1, and reaches food items 2a, 2b through spaces 6a, 6b, 6c, 6d inside container 1. This enables food items 2a, 2b to be easily heated by the steam. Part of the steam flowing into, and filling cooking space 8 and container 1 is discharged to an outside from a clearance between cooking space 8 and cooking space lid 9, and a clearance between container 1 and container lid 3.

At this time, the heating of the food item is performed for a proper predetermined time in accordance with the food item contained in container 1.

That is, the food container with a food item and the heating device for a food item in a food container of the first exemplary embodiment only need steam generation device 14. This makes a large device for steam suction as in the conventional art unnecessary.

Moreover, in food service industry or the like in which a cooked object is heated to serve the same to a customer, food items 2a, 2b are contained in container 1 beforehand. Thus, a staff can perform, for example, heating work and the like without directly touching food items 2a, 2b. As a result, the food container with a food item, and the heating device for a food item in a food container that are clean and easy to handle can be provided.

Hereinafter, the food item in the food container of the first exemplary embodiment will be described with reference to FIGS. 3 and 4, taking specific food items as examples.

FIG. 3 is an essential part cross-sectional view of the food container with a food item therein, which shows, as an example, the case where the food item in the first exemplary embodiment is frozen cooked rice. FIG. 4 is an essential part cross-sectional view of the food container with a food item therein, which shows, as an example, the case where the food item in the first exemplary embodiment is frozen noodles.

First, referring to FIG. 3, the case of frozen food item 17 where the food item is made of a plurality of grains such as frozen cooked rice and the like will be described as an example.

When frozen food item 17 such as frozen cooked rice and the like is filled in container 1, as shown in FIG. 3, frozen food item 17 is not simply filled in container 1, but spaces 18 made of a plurality of communication holes are provided in frozen food item 17 beforehand, and the food item is frozen and solidified into, for example, a substantially rectangular parallelepiped shape (including a rectangular parallelepiped shape). As the food item such as the frozen cooked rice and the like, the frozen cooked rice, frozen okowa, frozen pilaf and the like are exemplified.

Frozen food item 17 resulting from freezing and solidifying the food item beforehand is placed on holding portion 5 of container 1 to be contained in container 1. This allows food surrounding space 19a (hereinafter, abbreviated as "space 19a") to be formed between the bottom surface inner wall of container 1 and frozen food item 17, as shown in FIG. 3. Similarly, food surrounding space 19b (hereinafter, abbreviated as "space 19b") is formed between frozen food item 17 and side surface inner walls of container 1. Further, food surrounding space 19c (hereinafter, abbreviated as "space 19c") is formed between frozen food item 17 and the inner wall of container lid 3. This enables the steam supplied into container 1 to be applied to whole frozen food item 17 with spaces 18 formed through spaces 19a, 19b, 19c, 18 formed by frozen food item 17 and container 1, for example, without unevenness. As a result, heating of frozen food item 17 is efficiently promoted, so that a waste of time can be eliminated.

Next, referring to FIG. 4, the case where the food item is frozen food item 20 such as frozen noodles and the like will be described as an example.

When frozen food item 20 such as frozen noodles and the like is filled in container 1, as shown in FIG. 4, frozen food item 20 is not simply filled in container 1, but in a state where a plurality of spaces 21 are communicated in frozen food item 20, frozen food item 20 is frozen and solidified, for example, into a substantially rectangular parallelepiped shape (including a rectangular parallelepiped shape). As frozen food item 20 such as the frozen noodles and the like, the frozen udon, frozen soba, frozen ramen, frozen pasta and the like are exemplified.

Frozen food item 20 resulting from freezing and solidifying the food item beforehand is placed on holding portion 5 of container 1 to be contained in container 1. This allows food surrounding space 22a (hereinafter, abbreviated as "space 22a") to be formed between the bottom surface inner wall of container 1 and frozen food item 20, as shown in FIG. 4. Similarly, food surrounding space 22b (hereinafter, abbreviated as "space 22b") is formed between frozen food item 20 and the side surface inner walls of container 1. Further, food surrounding space 22c (hereinafter, abbreviated as "space 22c") is formed between frozen food item 20 and the inner wall of container lid 3. This enables the steam supplied into container 1 to be applied to whole frozen food item 20 with spaces 21 formed through spaces 22a, 22b, 22c, 21 formed by frozen food item 20 and container 1, for example, without unevenness. As a result, heating of frozen food item 20 is efficiently promoted, so that a waste of time can be eliminated.

The food container with a food item therein of the first exemplary embodiment is configured as described above.

While in the first exemplary embodiment, the example in which a thickness of holding portion 5 of container 1 is made constant, and the spherical projections are formed has been described, the present invention is not limited thereto. For example, holding portion 5 may have a linear rib shape. That is, holding portion 5 has any shape that has a space formed between the food item and container 1.

Moreover, while in the first exemplary embodiment, the configuration has been described as an example, in which cooking space 8 is provided inside cooking chamber 13, and the space when the steam is charged into container 1 is made small to increase heating performance, the present invention is not limited thereto. For example, when many food items are contained in container 1, so that container 1 is larger than cooking space 8, cooking space 8 may be removed to use cooking chamber 13 in place of cooking space 8. In this case, the steam is charged into container 1 disposed inside cooking chamber 13 from steam generation device 14 through steam ejection portion 15. That is, cooking space 8 and cooking chamber 13 can be used in a different manner, depending on a size of container 1. This can increase convenience of the heating device for a food item in a food container.

Moreover, while in the first exemplary embodiment, the configuration has been described as an example, in which the shape of frozen food items 17, 20 each configuring the food item is a substantially rectangular parallelepiped shape, and frozen food items 17, 20 are each solidified into a rectangular shape in planar view, the present invention is not limited thereto. For example, the shape of frozen food items 17, 20 may be a round shape or an elliptical shape in planar view. That is, any shape in which spaces 18, 21 are provided in frozen food items 17, 20 may be employed.

Moreover, while in the first exemplary embodiment, a shape of the opening holes formed in container 1 is not particularly mentioned, and a circular shape having a same diameter is shown in FIG. 2, the present invention is not limited thereto. For example, circular shapes having different diameters may be employed, so that the shape is arbitrary.

Second Exemplary Embodiment

Hereinafter, a configuration of a food container with a food item therein in a second exemplary embodiment of the present invention will be described with reference to FIG. 5.

Figure 5:
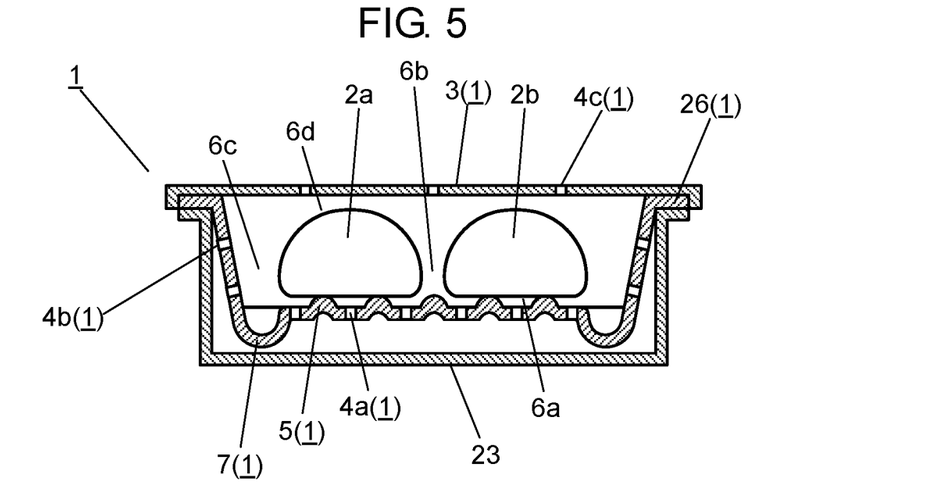
FIG. 5 is a cross-sectional view of a food container with a food item therein in a second exemplary embodiment of the present invention.

FIG. 5 is a cross-sectional view of a food container with a food item therein in the second exemplary embodiment of the present invention.

As shown in FIG. 5, the second exemplary embodiment is different from the first exemplary embodiment in that there is provided outer packaging container 23 (hereinafter, abbreviated as "outer container 23") that covers, from below, the food item in the food container after heating cooking. Other configurations are the same as those of the first exemplary embodiment, and thus, the same reference marks and the same names are given, and detailed description is omitted. As in the first exemplary embodiment, a food container is abbreviated as a container to give a description.

That is, outer container 23 is formed of, for example, a polypropylene resin or the like. The outer container 23 is provided so as to abut on flange portion 26 of container 1 after heating cooking and cover container 1 from below. Hot moisture and the like, which is generated from food items 2a, 2b heated by the steam and is condensed, can be discharged to outer container 23 through opening holes 4a formed in a bottom surface of container 1. As a result, a placing position where container 1 is disposed is prevented from being dirty. Furthermore, occurrence of a defect such as a burn of a user and the like by the hot moisture can be prevented. This enables the safe food container with a food item therein excellent in reliability to be configured.

Hereinafter, operation and actions of the food container with a food item therein and the heating device for a food item in a food container of the second exemplary embodiment will be described. In the following, different points from the first exemplary embodiment will be specifically described with reference to FIG. 1.

As shown in FIG. 5, the steam generated in steam generation device 14 of the heating device for a food item in a food container heats food items 2a, 2b contained in container 1 as in the first exemplary embodiment.

Thereafter, container 1 to which heating cooking has been completed is contained in outer container 23.

At this time, in a bottom surface inside container 1 immediately after the heating by the steam, the steam flowing in and the steam generated from food items 2a, 2b are condensed, so that hot moisture is accumulated. The condensed water accumulated in the bottom surface of container 1 is discharged from opening holes 4a and the like. The discharged condensed water falls into outer container 23 to be collected.

This can prevent dispersion of the condensed water around an installation place of the device or occurrence of contamination by the condensed water beforehand. Further, this can prevent occurrence of a burn or the like by scattered hot condensed water.

Moreover, container 1 immediately after the heating is hot due to the steam and the like. Consequently, covering container 1 with outer container 23 allows heat of container 1 itself to be insulated by outer container 23. Further, hotness of container 1 is reduced by outer container 23, which increases handleability.

Thus, work of a staff handling container 1 becomes smooth when the staff heats the cooked object to provide the same to a customer in food service industry or the like. As a result, the cooked object immediately after the heating can be quickly provided to the customer.

In the case of the second exemplary embodiment, it is preferable that container legs 7 of container 1 are each solid and have the same plane as the bottom surface of container 1 where holding portion 5 is formed. Moreover, if container legs 7 cannot be formed with the solid configuration, it is preferable that an opening portion is provided in a lowest portion of each of container legs 7. This allows the condensed water accumulated inside container 1 to be surely discharged into outer container 23 and collected.

Third Exemplary Embodiment

Hereinafter, a configuration of a food container with a food item therein and a heating device for a food item in a food container in a third exemplary embodiment of the present invention will be described with reference to FIG. 6.

Figure 6:
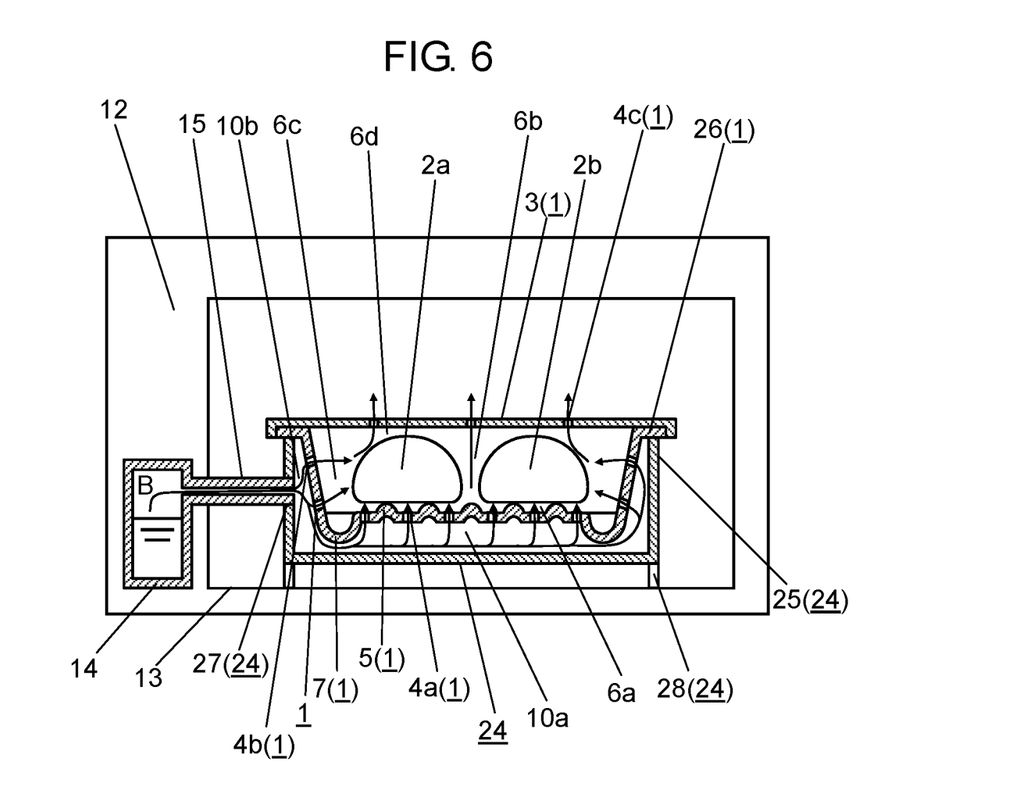
FIG. 6 is a cross-sectional view showing a food container with a food item therein and a heating device for a food item in a food container in a third exemplary embodiment of the present invention.

FIG. 6 is a cross-sectional view showing the food container with a food item therein and the heating device for a food item in a food container in the third exemplary embodiment of the present invention.

As shown in FIG. 6, the third exemplary embodiment is different from the first exemplary embodiment in that food container 1 with a food item therein is placed directly in opening portion 25 of cooking space 24 to be subjected to steam heating. That is, a configuration is such that cooking space lid 9 of the first exemplary embodiment is not provided. Other configurations are the same as those of the first exemplary embodiment, and thus, the same reference marks and the same names are given, and detailed description is omitted. As in the first exemplary embodiment, a food container is abbreviated as a container to give a description.

As shown in FIG. 6, cooking space 24 of the third exemplary embodiment is formed of, for example, a polypropylene resin or the like, and in an upper surface of cooking space 24, opening portion 25 is included. Flange portion 26 of container 1 is caused to abut on opening portion 25 of cooking space 24 and is placed thereon. This makes an inside of cooking space 24 a closed space.

In the above-described state, projection-like steam ejection portion 15 of steam generation device 14 is fitted into steam charging port 27 provided in a side surface wall of cooking space 24. Steam generated in steam generation device 14 is supplied into cooking space 24 from steam ejection portion 15. For example, columnar cooking space legs 28, which support whole cooking space 24, are included in an outer wall of a bottom surface of cooking space 24.

The food container with a food item therein and the heating device for a food item in a food container of the third exemplary embodiment are configured as described above.

Hereinafter, operation and actions of the food container with a food item therein and the heating device for a food item in a food container of the third exemplary embodiment will be described. In the following, different points from the first exemplary embodiment will be specifically described with reference to FIG. 1.

First, as shown in FIG. 6, cooking space 24 is installed inside cooking chamber 13 of cooker body 12. Flange portion 26 of container 1 is caused to abut on opening portion 25 of cooking space 24, and is placed thereon. At this time, container 1 itself serves for a lid of cooking space 24 corresponding to cooking space lid 9 described in the first exemplary embodiment. This can make an inside of cooking space 24 a closed space. At this time, food items 2a, 2b are contained in container 1, and are closed by container lid 3.

Next, an operation portion (not shown) provided in a door of cooker body 12 is operated to drive steam generation device 14. This allows the steam generated in steam generation device 14 to flow into cooking space 24 from steam ejection portion 15 through steam charging port 27 of cooking space 24 and fill cooking space 24. At this time, the steam flowing into cooking space 24 reaches opening holes 4a, 4b of container 1 through clearances 10a, 10b, as indicated by arrow B in FIG. 6. The steam flows in from opening holes 4a, 4b of container 1 to reach food items 2a, 2b through spaces 6a, 6b, 6c inside container 1. This enables food items 2a, 2b inside container 1 to be easily heated by the steam.

Part of the steam flowing into container 1 is ejected into cooking chamber 13 from opening holes 4c provided in container lid 3.

This makes smooth flows of the steam applied to food items 2a, 2b. As a result, heating performance to food items 2a, 2b by the steam further increases.

Moreover, according to the third exemplary embodiment, cooking space lid 9 is unnecessary, which makes an internal space of cooking space 24 smaller. This can make cooking space 24 smaller.

Furthermore, according to the third exemplary embodiment, since cooking space lid 9 is not provided, work for putting container 1 in cooking space 24 is easier. This makes smooth work of a staff when a cooked object is heated to be provided to a customer in food service industry or the like. As a result, the cooked object immediately after the heating can be quickly provided to the customer.

Fourth Exemplary Embodiment

Hereinafter, a configuration of a food container with a food item therein and a heating device for a food item in a food container in a fourth exemplary embodiment of the present invention will be described with reference to FIGS. 7 and 8.

Figure 7:
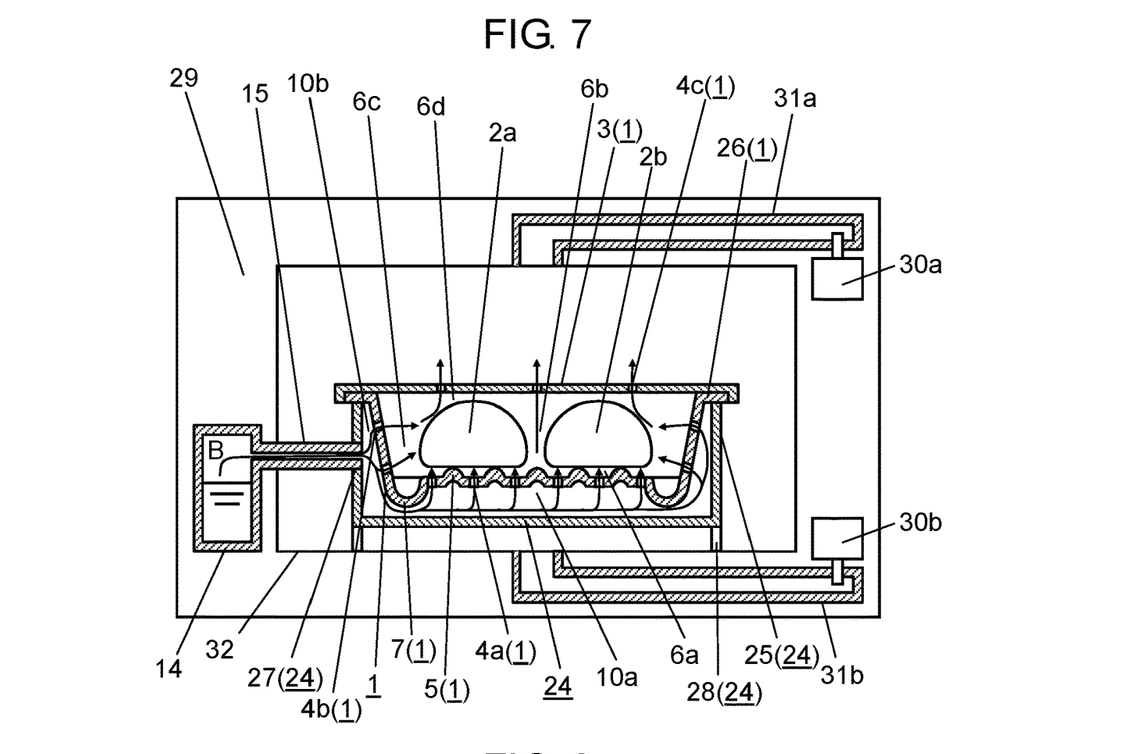
FIG. 7 is a cross-sectional view showing a food container with a food item therein and a heating device for a food item in a food container in a fourth exemplary embodiment of the present invention.
Figure 8:
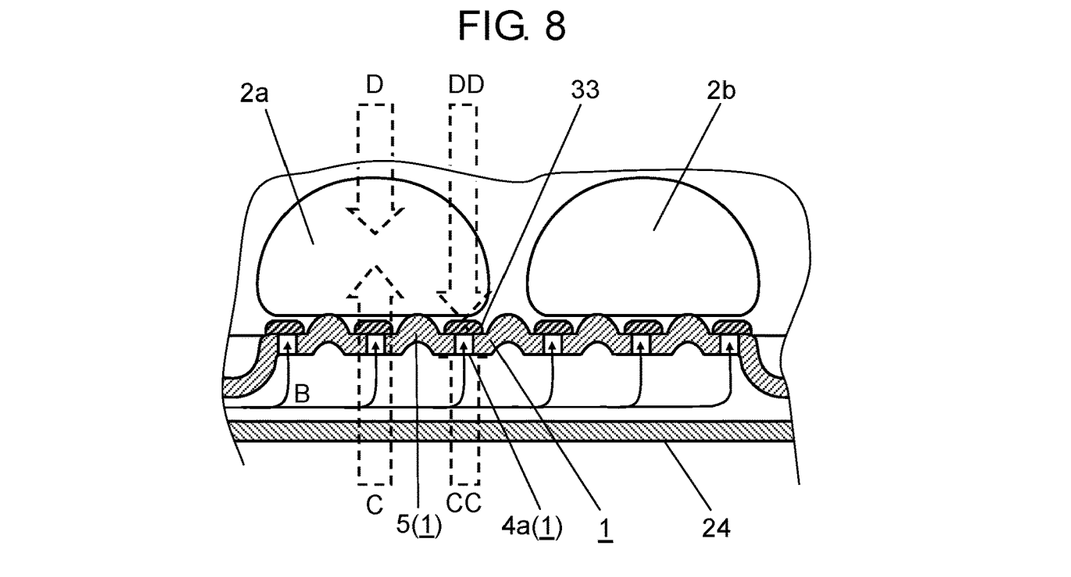
FIG. 8 is an essential part cross-sectional view of the food container with a food item therein in the fourth exemplary embodiment.

FIG. 7 is a cross-sectional view showing the food container with a food item therein and the heating device for a food item in a food container in the fourth exemplary embodiment of the present invention, and FIG. 8 is an essential part cross-sectional view of the food container with a food item therein in the fourth exemplary embodiment.

As shown in FIG. 7, the fourth exemplary embodiment is different from the configuration of the heating device for a food item in a food container of the third exemplary embodiment in that a microwave generation device is further provided in the heating device for a food item in a food container. Other configurations are the same as those described in the third exemplary embodiment, and thus, the same reference marks and the same names are given, and detailed description is omitted. As in the third exemplary embodiment, a food container is abbreviated as a container to give a description.

That is, as shown in FIG. 7, the heating device for a food item in a food container in the fourth exemplary embodiment includes, in cooker body 29, steam generation device 14 that performs heating by steam and the microwave generation device that performs heating by a microwave. The microwave generation device is made up of magnetron 30a provided in an upper portion of cooker body 29, and a magnetron 30b provided in a lower portion thereof. A microwave emitted from upper magnetron 30a is radiated into cooking chamber 13 from an upper surface of cooking chamber 32 through wave guide 31a. On the other hand, a microwave emitted from lower magnetron 30b is radiated into cooking chamber 13 from a bottom surface of cooking chamber 32 through wave guide 31b. This allows the cooked objects such as food items 2a, 2b and the like inside container 1 disposed inside cooking chamber 32 to be heated by the microwave.

The heating device for a food item in a food container of the fourth exemplary embodiment is configured as described above.

Operation and actions of the food container with a food item therein and the heating device for a food item in a food container of the fourth exemplary embodiment will be described with reference to FIGS. 7 and 8.

First, as shown in FIG. 7, cooking space 24 is installed inside cooking chamber 32 of cooker body 12. Flange portion 26 of container 1 is caused to abut on opening portion 25 of cooking space 24, and is placed thereon. At this time, container 1 itself serves for a lid of cooking space 24 corresponding to cooking space lid 9 described in the first exemplary embodiment. This can make an inside of cooking space 24 a closed space. At this time, food items 2a, 2b are contained in container 1, and are covered with container lid 3.

Next, an operation portion (not shown) provided in a door of cooker body 29 is operated to drive steam generation device 14. This allows steam generated in steam generation device 14 to flow into cooking space 24 from steam ejection portion 15 through steam charging port 27 of cooking space 24 and fill cooking space 24. At this time, the steam flowing into cooking space 24 reaches opening holes 4a, 4b of container 1 through clearances 10a, 10b, as indicated by arrow B in FIG. 7. The steam flows in from opening holes 4a, 4b of container 1 to reach food items 2a, 2b through spaces 6a, 6b, 6c inside container 1. This enables food items 2a, 2b inside container 1 to be easily heated by the steam.

Part of the steam flowing into container 1 is ejected into cooking chamber 32 from opening holes 4c provided in container lid 3.

On the other hand, in the fourth exemplary embodiment, when steam generation device 14 is driven, magnetrons 30a, 30b as the microwave generation device are simultaneously driven. This allows the microwave to be output from the upper surface and the bottom surface of cooking chamber 32 through wave guides 31a, 31b. Thereby, food items 2a, 2b inside container 1 are heated by the microwave indicated by arrows C and D in FIG. 8.

That is, in the fourth exemplary embodiment, food items 2a, 2b inside container 1 are heated by the steam from steam generation device 14, and heated by the microwave from the microwave generation device. Thereby, food items 2a, 2b inside container 1 are each directly heated from a food inside by the microwave in addition to the heating by the steam, which supplies heat from a food surface. As a result, heating performance is increased, which can shorten a heating time.

Moreover, according to the fourth exemplary embodiment, when a frozen food item is used as a food item in order to put off a consumption time limit, the steam heating and the microwave heating are simultaneously applied to exert especially the following two effects.

(1) The microwave has a property of exerting about 2000 times as large a heating action to water as that to ice. That is, even if the microwave is applied to a frozen food item, a heating effect is small. Consequently, first, the steam supplied from the steam generation device is applied to the frozen food item to immediately generate condensed water in a food surface layer portion. When the microwave is applied to the generated condensed water, the microwave efficiently acts on the condensed water, and drastically heats the condensed water. This largely increases heating efficiency to the frozen food item.

(2) When the frozen food item is contained in container 1, moisture coming from circumambient air, the food and the like becomes ice 33. At this time, ice 33 may adhere to opening holes 4a and the like of container 1, as shown in FIG. 8. Thereby, charging only the steam into cooking space 24 brings about a state where ice 33 attaching to opening holes 4a of container 1 closes passages of the steam to the frozen food item indicated by arrow B in FIG. 7. Thus, the frozen food item cannot be heated by the steam before ice 33 attaching to opening holes 4a is melted. As a result, it takes time to heat the food item.

However, in the fourth exemplary embodiment, the food item is simultaneously heated by the steam and by the microwave. At this time, the steam first acts on ice 33 closing opening holes 4a of container 1. This produces condensed water on a surface of the ice similar to the action described in the above (1). The microwave efficiently acts on, and heats the condensed water generated by the action of the steam, as indicated by arrows CC and DD in FIG. 8. This quickly melts closing ice 33 through the heating of the condensed water by the microwave. Thus, ice 33 changes to water in a short time, and flows out from opening holes 4a. The passages of steam that allow the steam to flow into container 1 from the opening portions can be secured.

As a result, even when the opening portions of container 1 are closed by ice 33, the steam can be quickly applied to the frozen food item to solve trouble by ice 33.

Moreover, even while inflow of the steam is hindered by ice 33 closing the opening portions, the frozen food item is directly heated by the microwave, as indicated by arrows C and D in FIG. 8.

That is, according to the fourth exemplary embodiment, the steam heating and the microwave heating are simultaneously applied to heat in combination, which brings about the above-described large advantages.

Moreover, according to the fourth exemplary embodiment, as a material of container 1 and cooking space 24, a polypropylene resin, which easily transmits the microwave, is used. This can increase heating performance to the food item or the like by the microwave. Furthermore, since the polypropylene resin is relatively inexpensive, a low-cost configuration can be provided.

While in the fourth exemplary embodiment, a description has been given, taking an example in which as the food item, food items 2a, 2b such as meat buns and the like are used, the present invention is not limited thereto. For example, frozen food item 17 such as frozen cooked rice or frozen food item 20 such as frozen noodles, which has been described in the first exemplary embodiment, may be used. That is, since the steam and the microwave are used in combination to perform the heating as in the fourth exemplary embodiment, heating performance can be increased, especially, with respect to the frozen food item.

Moreover, while in the fourth exemplary embodiment, the configuration has been described as an example, in which the microwave is output (radiated) from the upper surface and the bottom surface of cooking chamber 32, the present invention is not limited thereto. For example, a configuration may be such that the microwave is output from any one of the upper surface and the bottom surface of cooking chamber 32. That is, the configuration only needs be such that the steam and the microwave are used in combination to heat the food item.

While in the first, third, and fourth exemplary embodiments, the configurations have been described as examples, in which the steam is charged into cooking spaces 8, 24 by inserting steam ejection portion 15 into steam charging ports 16, 27 of cooking spaces 8, 24, the present invention is not limited thereto. For example, the configuration may be such that steam ejection portion 15 and steam charging ports 16, 27 are made of different members, and that alignment is performed to charge the steam. That is, any configuration that the steam can be charged into cooking spaces 8, 24 may be employed.

As described above, a food container with a food item of the present invention that contains and seals one or more food items includes an opening hole for steam suction provided in the food container to communicate with an internal space and an external space of the food container, and at least one of a food surrounding space provided between an inner wall of the food container and the food items, and between the food items. The configuration may be such that the food surrounding space and the external space are communicated with each other through the opening hole.

According to this configuration, the steam is charged into the food surrounding space inside the food container from the opening hole for steam suction. This allows the steam to easily reach the food items, so that the food items can be quickly subjected to the steam heating.

Moreover, a heating device for a food item in a food container of the present invention includes the food container that contains one or more the food items, a cooking container that contains the food container, and a steam generation device that supplies steam into the cooking container. The food container has an opening hole provided in the food container to communicate with an internal space and an external space of the food container, and at least one of a food surrounding space provided between an inner wall of the food container and the food items, and between the food items. The configuration may be such that the food surrounding space and the external space are communicated with each other through the opening hole, and the steam is supplied into the cooking container from the steam generation device to subject the food items to the steam heating.

According to this configuration, when the steam is charged into the cooking container where the food container is installed, the steam comes into direct contact with the food items, which enables the food items to be easily heated. This can make unnecessary a large device for sucking the steam as in the conventional art. As a result, the small, inexpensive heating device for a food item in a food container that enables the food item to be heated by the steam can be realized.

Moreover, in the heating device for a food item in a food container of the present invention, after the food items in the food container are cooked with heat, part or all of the food items in food container are covered with an outer packaging container. The configuration may be such that the food items in food container are held inside the outer packaging container.

According to this configuration, after the food items are heated by the steam, hot condensed water, which is discharged from the opening hole of the food container, is collected by the outer packing container. This can prevent surrounding contamination by the discharged condensed water, occurrence of a burn or the like beforehand. Moreover, the hot food container immediately after the heating can be thermally insulated by the outer packaging container, and handling of the food container can be made easy.

Moreover, in the heating device for a food item in a food container of the present invention, the food item may be a frozen food item. This can largely put off a consumption time limit of the food item.

Moreover, the heating device for a food item in a food container of the present invention has an opening portion provided in the cooking container, the opening portion and part of an outer wall surface of the food container are joined to charge the steam into the cooking container. The configuration may be such that the steam is sent into the food container, and the steam is applied to the food items inside the food container to heat the food items. This makes it unnecessary to set a size of the cooking container to an enough size to put the whole food container into the cooking container. This can reduce the size of the cooking container itself. Furthermore, a state can be brought about where the steam is charged into the food container from the cooking container, and the steam flows out to an outside of the food container from an inside of the food container. This can make smooth flows of the steam applied to the food item. As a result, heating performance to the food item by the steam is increased.

Moreover, the heating device for a food items in a food container of the present invention may be configured to have a microwave generation device that supplies a microwave to the cooking container, wherein the food item is heated by the steam, and is further heated by the microwave supplied from the microwave generation device. This enables a food item inside to be directly heated by the microwave in addition to the steam heating, which supplies the heat from the surface of a food item. As a result, the heating device for the food container with the food item put therein that can increase the heating performance to the food item can be obtained.

INDUSTRIAL APPLICABILITY

A food container with a food item therein and a heating device for a food item in a food container of the present invention enable a food item put in a container to be heated only by a simple steam generation device. Thus, the present invention can be applied to a processing device for a heating process or the like in a food factory where a food item put in a container is heated.

REFERENCE MARKS IN THE DRAWINGS

1: container (food container)
2a, 2b: food item (food item in food container)
3: container lid
4a, 4b, 4c: opening hole
5: holding portion
6a, 6b, 6c, 6d, 19a, 19b, 19c, 22a, 22b, 22c: space (food surrounding space)
7: container leg
8, 24: cooking space (cooking container)
9: cooking space lid
10a, 10b, 10c: clearance
11, 28: cooking space leg
12, 29: cooker body
13, 32: cooking chamber
14: steam generation device
15: steam ejection portion
16, 27: steam charging port
17, 20: frozen food item
18, 21: space
23: outer container (outer packaging container)
25: opening portion
26: flange portion
30a, 30b: magnetron
31a, 31b: wave guide
33: ice

The invention claimed is:

1. A heating device for heating one or more food items, the heating device comprising:
   the heating device including a body having a chamber therein;
   a cooking container in the chamber, wherein a food container containing the one or more food items resides in the cooking container;
   a steam generation device in the body that supplies steam into the cooking container,
   wherein the food container includes:
   a container lid having openings therein and a bottom surface having openings therein, the openings of the container lid and the bottom surface communicate with an internal space and an external space of the food container; and
   a food surrounding space between an inner wall of the bottom surface of the food container and the food items, and a second food surrounding space between the food items,
   first projections configured to form the first food surrounding space between the food items and the inner wall of the bottom surface of the food container,
   second projections configured to form a clearance between a bottom surface inner wall of the cooking container and an outer wall of the bottom surface of the food container,
   wherein the first projections define a convex surface on an upper side thereof with the openings of the bottom surface therebetween,
   the second projections define a convex surface on a lower side thereof, and
   the steam is supplied into the cooking container from the steam generation device to subject the food items to steam heating.

2. The heating device according to claim 1, wherein after the food items in the food container are cooked with heat, part or all of the food items in the food container are covered with an outer packaging container, and the food items in the food container are held inside the outer packaging container.

3. The heating device according to claim 1, wherein the food items in the food container are frozen food items.

4. The heating device according to claim 1, wherein the chamber and part of an outer wall surface of the food container are joined, the steam from the steam generation device is charged into the cooking container, the steam is sent into the food container through the openings, and the steam is applied to the food items inside the food container to heat the food items.

5. The heating device according to claim 1, further comprising a microwave generation device that supplies a microwave to the cooking container, wherein the food items are heated by the steam, and are further heated by the microwave supplied from the microwave generation device.

6. The heating device according to claim 1, the food container further comprising legs on a bottom surface outer wall of the food container, wherein the legs provide a clearance between a bottom surface inner wall of the chamber and the bottom surface outer wall of the food-cooking container.

7. The heating device according to claim 1, wherein the food container is formed of a polypropylene resin.

8. The heating device according to claim 1, wherein both the food container and the cooking container comprise a polypropylene resin.

9. The heating device according claim 1, wherein a number of the openings are larger than a number of the first projections, and the number of the first projections is larger than a number of the second projections.

* * * * *